(12) United States Patent
Reneris et al.

(10) Patent No.: US 7,739,505 B2
(45) Date of Patent: Jun. 15, 2010

(54) LINKING DIFFIE HELLMAN WITH HFS AUTHENTICATION BY USING A SEED

(75) Inventors: Kenneth Reneris, Woodinville, WA (US); David J. Marsh, Sammamish, WA (US); David R. Blythe, Kirkland, WA (US); Kirt A. Debique, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 11/202,838

(22) Filed: Aug. 12, 2005

(65) Prior Publication Data

US 2006/0242409 A1 Oct. 26, 2006

Related U.S. Application Data

(60) Provisional application No. 60/673,979, filed on Apr. 22, 2005.

(51) Int. Cl.
*H04L 9/00* (2006.01)
*G06F 21/00* (2006.01)

(52) U.S. Cl. .................................. 713/171; 713/189

(58) Field of Classification Search ................ 713/168, 713/171, 175, 181, 187, 189, 191; 380/44
See application file for complete search history.

(56) References Cited

U.S. PATENT DOCUMENTS

| 4,183,085 | A * | 1/1980 | Roberts et al. ............. 705/76 |
| 5,799,088 | A * | 8/1998 | Raike ........................ 380/30 |
| 6,327,652 | B1 * | 12/2001 | England et al. ............. 713/2 |
| 6,409,089 | B1 * | 6/2002 | Eskicioglu ................ 235/492 |
| 7,043,633 | B1 * | 5/2006 | Fink et al. ................ 713/162 |
| 7,124,938 | B1 * | 10/2006 | Marsh ...................... 235/382 |
| 7,343,496 | B1 * | 3/2008 | Hsiang et al. .............. 713/194 |
| 2001/0021252 | A1 * | 9/2001 | Carter et al. .............. 380/247 |
| 2003/0065918 | A1 * | 4/2003 | Willey ...................... 713/168 |
| 2003/0069981 | A1 * | 4/2003 | Trovato .................... 709/228 |
| 2003/0133576 | A1 * | 7/2003 | Grumiaux .................. 380/279 |
| 2004/0003268 | A1 | 1/2004 | Bourne et al. |
| 2004/0003269 | A1 | 1/2004 | Waxman |
| 2004/0003270 | A1 | 1/2004 | Bourne et al. |
| 2004/0184605 | A1 * | 9/2004 | Soliman ..................... 380/44 |
| 2004/0225894 | A1 * | 11/2004 | Colvin ...................... 713/200 |
| 2005/0210252 | A1 * | 9/2005 | Freeman et al. ............ 713/171 |
| 2006/0020860 | A1 * | 1/2006 | Tardif et al. ............... 714/724 |
| 2006/0045267 | A1 * | 3/2006 | Moore et al. .............. 380/247 |
| 2006/0149966 | A1 * | 7/2006 | Buskey et al. ............. 713/168 |

OTHER PUBLICATIONS

Arbaugh, W.A.; Farber, D.J.; Smith, J.M. "A Secure and Reliable Bootstrap Architecture," IEEE Symposium on Security and Privacy, pp. 65-71, May 1997.*
U.S. Appl. No. 10/835,951, Jeffrey R. McKune et al.

(Continued)

*Primary Examiner*—Gilberto Barron, Jr.
*Assistant Examiner*—Hadi Armouche

(57) ABSTRACT

A method of chip authentication is presented. The method includes verifying a driver identity. The method also includes establishing a Diffie Hellman key. Further, the method includes hashing the Diffie Hellman key. The method also includes picking a seed. Further, the method includes performing a hardware functional scan with the seed.

10 Claims, 7 Drawing Sheets

OTHER PUBLICATIONS

U.S. Appl. No. 11/116,598, Kirt A. Debique et al.
U.S. Appl. No. 11/191,448, Sohail Baig Mohammed et al.
U.S. Appl. No. 09/290,363, Arnold N. Blinn et al.
International Search Report, PCT/US 06/10664. Dated Oct. 23, 2007. pp. 1-9.
Arbaugh, et al., "A Secure and Reliable Bootstrap Architecture", IEEE Symposium on Security and Privacy. May 4-7, 1997. pp. 65-71.

* cited by examiner

LINKING DIFFIE HELLMAN WITH HFS AUTHENTICATION BY USING A SEED

CROSS-REFERENCE TO RELATED APPLICATION

This application claims the benefit of U.S. Provisional Patent Application No. 60/673,979 filed Apr. 22, 2005, the contents of which are hereby incorporated by reference.

BACKGROUND

This description relates generally to computer security and more specifically to verification methods. Such a system may include any number of components that may be coupled by a variety of interfaces. In such a system an owner of protected content typically seeks verification that sufficient security exists before transmitting content. A chain of trust may be used to establish security in such a system. As the use of these systems increase in security tends to become more of a concern due to the increasing transmission of valuable content, and the fact that unauthorized users tend to become more sophisticated in gaining access to protected content.

A provider of high value content or information may wish to ensure that a conventional open computing system such as a PC is secure. A PC and many processor based systems, typically present an open system in which hardware components may be easily removed and replaced. Such an open system may present multiple access points for unauthorized access to the content.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a PC based system, the system described is provided as an example and not a limitation. As those skilled in the art will appreciate, the present examples are suitable for application in a variety of different types of computing systems.

Figure 1:
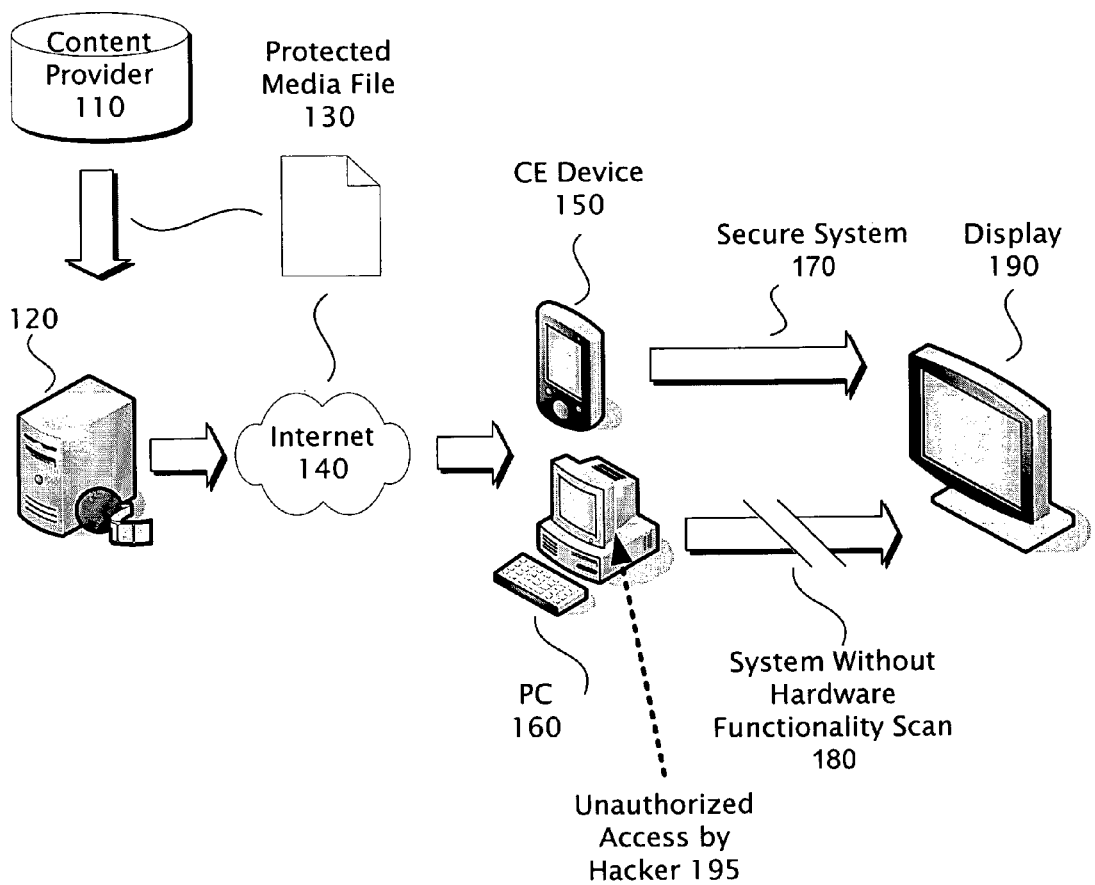
FIG. 1 is a block diagram showing a conventional PC without a hardware functionality scan ("HFS") system and a CE device with a secure system.

FIG. 1 is a block diagram showing a conventional PC 160 or CE device 150 without a hardware functionality scan ("HFS") system 180 that may be used to play a conventional protected media file 130. Such a PC 160 without a hardware functionality scan system may leave the protected media file 130 susceptible to interception by a hacker or another unauthorized party. The content provider 110 is typically coupled to a media server 120. The content provider 110 typically places the protected media file 130 on the media server 120. The protected media file 130 may be created at the media server from content provided by the service provider, or the service provider may provide a protected media file 130 to the media server 120. The protected media file 130 typically includes audio and visual information or the like. The media server 120 is typically coupled to the internet 140, and the internet 140 is typically coupled to either a PC 160 or a CE device 150. The PC 160 or CE device 150 are but two examples of devices that are equipped with a processor. It is specifically contemplated that a variety of devices may equivalently substituted for a PC 160 or CE Device 150. In the following description it will be understood that the term PC may include CE devices, processor board devices and the like. A CE device 150 is typically not easy to tamper with because of the fixed configuration of these devices. In contrast, a PC 160 is an open system that may be easily accessible.

The PC 160 is typically part of a conventional secure system 170, the secure system 170 typically includes PC components and methods of protection which may satisfy the content provider 110 that unauthorized access by a hacker 195 may not occur.

The conventional secure system 170 may include a CPU and display 190 which typically renders image information so it may be viewed. In a conventional PC system, the PC 160 is coupled to an external display or monitor 190. Systems that are graphics intensive may take advantage of a conventional graphics processor to aid in rendering a displayed object. The connection between the processor in the CPU and the processor of a graphics device may allow unauthorized access by a hacker 195 at this point. Such a "secure system" 170 may allow playing of protected media file 130 on the display 190. Typically the content provided to the graphics processor is unencrypted.

Figure 2:
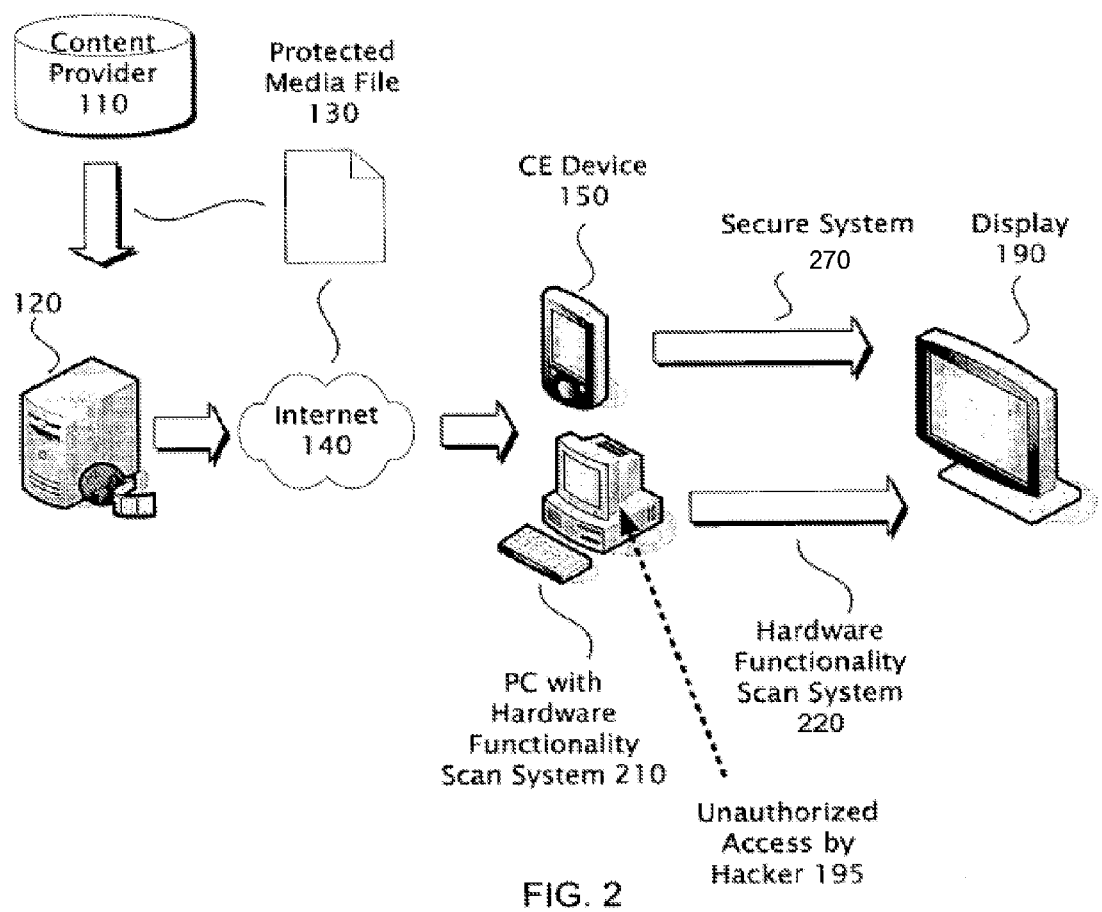
FIG. 2 is a block diagram showing a conventional PC with a hardware functionality scan system and a CE device with a secure system.

FIG. 2 is a block diagram showing a PC 210 equipped with a hardware functionality scan system 220. The content provider 110 is typically coupled to a media server 120. The content provider 110 typically places the protected media file 130 on the media server 120, the protected media file 130 typically includes audio and visual information or the like. The media server 120 is usually coupled to the internet 140, and the internet 140 is typically coupled to a PC 210.

The PC 210 in the secure system 270 may be coupled to a display 190 which typically renders image information so it may be viewed. The PC 210, and its secure system 270, includes a hardware functionality scan system 220. A hardware functionality scan ("HFS") system can further verify the security permission requested by the content provider 110 to insure that a hacker or other unauthorized party 195 is not accessing an unprotected version of the protected media file 130 at the vulnerable point 340. A hardware functionality scan is typically performed to verify a security permission on the PC 160, the security permission typically indicating a (part of a) proper hardware configuration to prevent unauthorized access by hacker 195 of the protected media file 130 at point 340.

Figure 3:
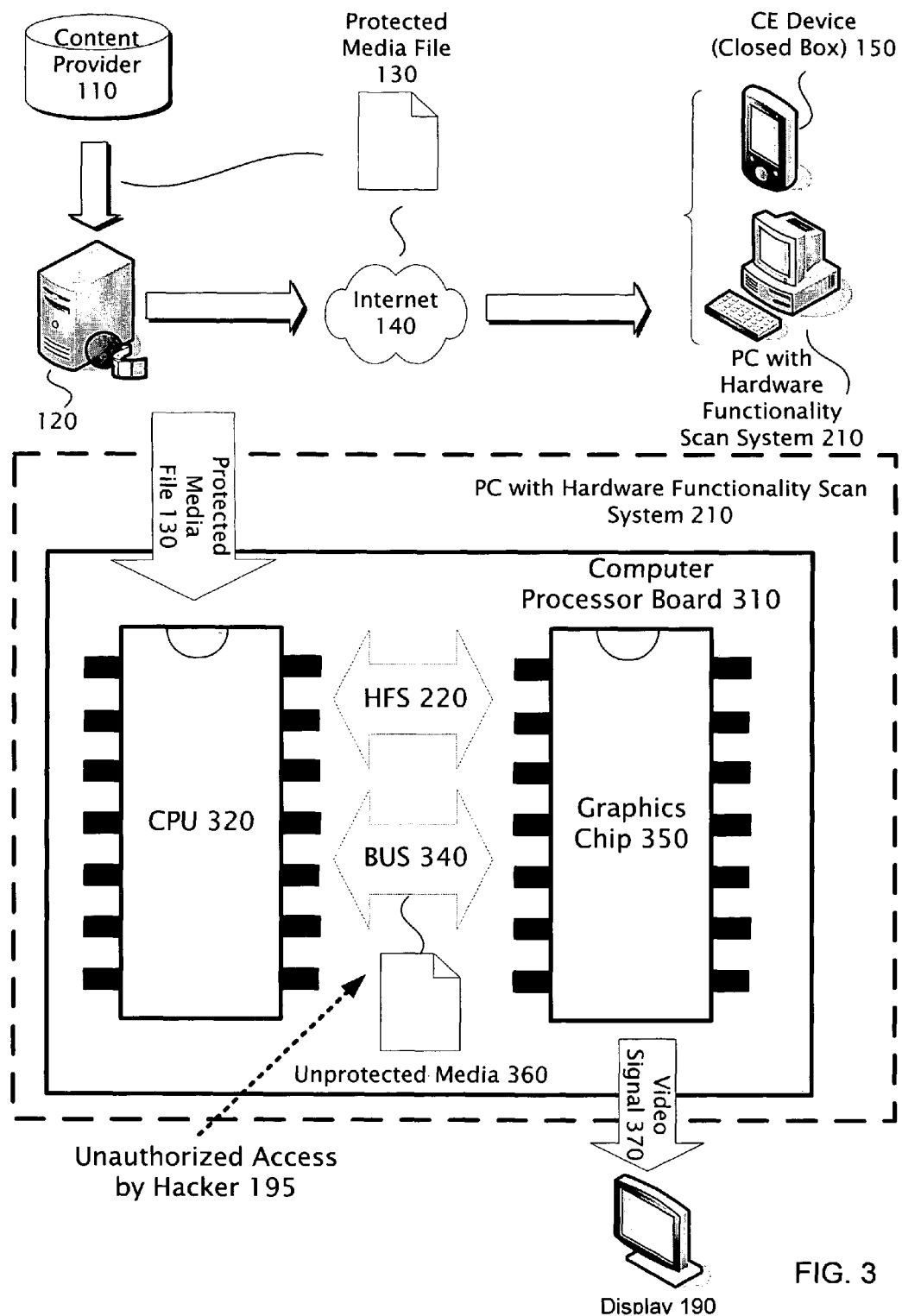
FIG. 3 is a block diagram a CPU and a graphics device of a processor being protected by a hardware functionality scan system.

FIG. 3 is a block diagram showing a hardware functionality scan being performed between a CPU 320 and a graphics device 350 on a PC with a hardware functionality scan system 210. A PC having hardware functionality scan 210 capabilities typically includes a computer processor board 310 which may contain a CPU 320 coupled to a bus 340. The bus 340 may be coupled in turn to a graphics device 350. The graphics device 350 may represent a complex IC which may render shapes in unique ways. In general, the typical complexity of a graphics device and any unique rendering signatures it possesses may be used to verify that graphics device 350 is present instead of a hacker.

Unauthorized access by hacker 195 may be attempted through the use of a device emulation that attempts to mimic the real graphics device, and would allow the hacker to access and copy the unprotected media 360. In such an arrangement the CPU 320 would not have information that anything but a "real" graphics device is present. The CPU 320 would not receive any indication that an emulator is intercepting the unprotected content. The graphics device emulation that mimics the real graphics device may not be able to simulate the complexity of the real graphics device, and thus may not be able to produce the unique rendering signatures of the real graphics device hardware functionality scan system 220 which tests the complexity and the unique rendering signature may detect the hacker. Thus a device which mimics the real graphics device may not be verified by a system including a hardware functionality scan 220.

The content provider 110 typically prevents unauthorized copying or viewing of the protected media file 130 by digitally encrypting protected media file 130. Such a system typically depends on a chain of trust structure. Protected media file 130 may be encrypted using any acceptable current encryption method for delivery to either a CE device 150 or a PC 210. For example, if the PC 210 is authorized by a content provider 110 to view a protected media file 130, the PC 210 will be given (though a secure mechanism) the encryption key(s) which allows decrypting of protected media file 130.

An example of a Digital Rights Management encryption system is provided in U.S. patent application Ser. No. 09/290, 363, filed Apr. 12, 1999, U.S. patent applications Ser. Nos. 10/185,527, 10/185,278, and 10/185,511, each filed on Jun. 28, 2002 which are hereby incorporated by reference in its entirety. The authorized PC 210 may use CPU 320 to decrypt the protected media file 130 and produce unprotected media 360. The unprotected media 360 is typically passed across the bus 340 in either re-encrypted or unencrypted form to the graphics device 350, which may convert the unprotected media 360 into a video signal 370 which may be displayed by display 190.

As previously noted the unprotected media 360 is susceptible to unauthorized access by a hacker 195, which may take the form of the hacker or any unauthorized user intercepting the unprotected media 360 on the bus 340. Once the protected media file 130 has been decrypted by CPU 320 it becomes unprotected media 360, susceptible to unauthorized copy by a hacker who may have replaced graphics device 350 with another device capable of capturing and copying unprotected media 360. A content provider 110 who has taken care to protect the delivery of content may also wish to take steps to protect content from a hacker 195.

PC's typically have an open architecture that makes them somewhat susceptible to tampering. While CE Device 150 may be a closed box system wherein it may be difficult for a hacker to replace graphics device 170 with a device capable of copying unprotected media 360, PC 210 is an open box system in which it may be easy for a hacker or any other unauthorized party to replace graphics device 350 with a device which mimics graphics device 350 and is capable of copying unprotected media 360. Therefore, before Content Provider 110 may allow protected media file 130 to be downloaded or streamed to PC 210, content provider 110 may require that the PC 210 has the security permission afforded by HFS 220 and is coupled to graphics device 350 and not some other capture device which mimics graphics device 350 put in place by a hacker or any unauthorized user.

The graphics device 350 may contain a digitally signed certificate which could be queried by CPU 320 in order to verify the authenticity of graphics device 350. However, due to the properties of the manufacturing process used to create graphics device 350, it may not be cost effective to encode a unique certificate or other unique identifier in each graphics device 350. A simpler or more cost effective solution to prove the authenticity of graphics device 350 may be used, or may be used to augment a device certificate solution. CPU 320 may employ a hardware functionality scan system 220.

A graphics device 350 is typically a complex device which may be made up of a large number of logic gates across one or more integrated circuits coupled to one another in complex arrangements. A graphics device 350 may also render shapes and other graphical elements in a unique manner. The unique manner in which a graphics device 350 may render shapes and other graphical elements may be utilized by a CPU 320 to verify that it is coupled to a real graphics device 350 and not some other device which mimics the graphics device 350. The CPU 320 may perform a hardware functionality scan 220 by performing queries to test the unique complex hardware structure of the graphics device 350 such as submitting a shape or other graphical element to the graphics device 350 for rendering and comparing the results of the rendering to an expected result. Typically due to the complexity of the graphics device 350 it is difficult to duplicate or produce by emulation the correct response to the hardware functionality scan 220 by a hacker or another unauthorized party.

To uniquely identify the graphics device 350 the queries or requests of the graphics device 350 may be constructed in such a way that only the specific graphics device 350 may be capable of providing an answer or response that verifies graphics device 350. This is typically possible because graphic device 350 and graphics devices in general are composed of a complex arrangement of a large number of gates and have implemented upon them a typically complex state model. Therefore, the same question or request made of two differently manufactured models of graphics device may result in a different answer, or return a different results. An analysis of the answer or returned results will typically identify the graphics device 350.

For example, the CPU 320 may send a three dimensional shape to the graphics device 350 and request the graphics device 350 perform a transformation in three dimensional space, such as shading. The graphics device 350 may then send the resulting transformed or rendered three dimensional shape to the CPU 320. The CPU 320 may examine the returned result to determine if the mathematical representation of the transformed complex three dimensional shape agrees with the results expected by CPU 320. Comparisons may be made by consulting a lookup table or a software emulation of the hardware or the like.

In another example, the CPU 320 may have stored a complex mathematical expression. A typical expression would exercise the areas of the graphics device 350 that would typically calculate a unique and known answer for the manufactured model. Further, a typical expression may also include random data, either in the form of agreed upon random parameters to the expression, and/or the expression itself may be chosen at random. For example, a calculated result may have a unique number of digits or a known rounding error that may be exploited. Further, in another example, graphics device 350 may have been manufactured such that additional boundary scan circuitry within the integrated circuits may have been added to verify the functioning of the graphics device 350 in the factory. The boundary scan circuitry may be unique to each model of graphics device 350 and CPU 320 may query the boundary scan circuitry and analyze the results to verify graphics device 350.

Figure 4:
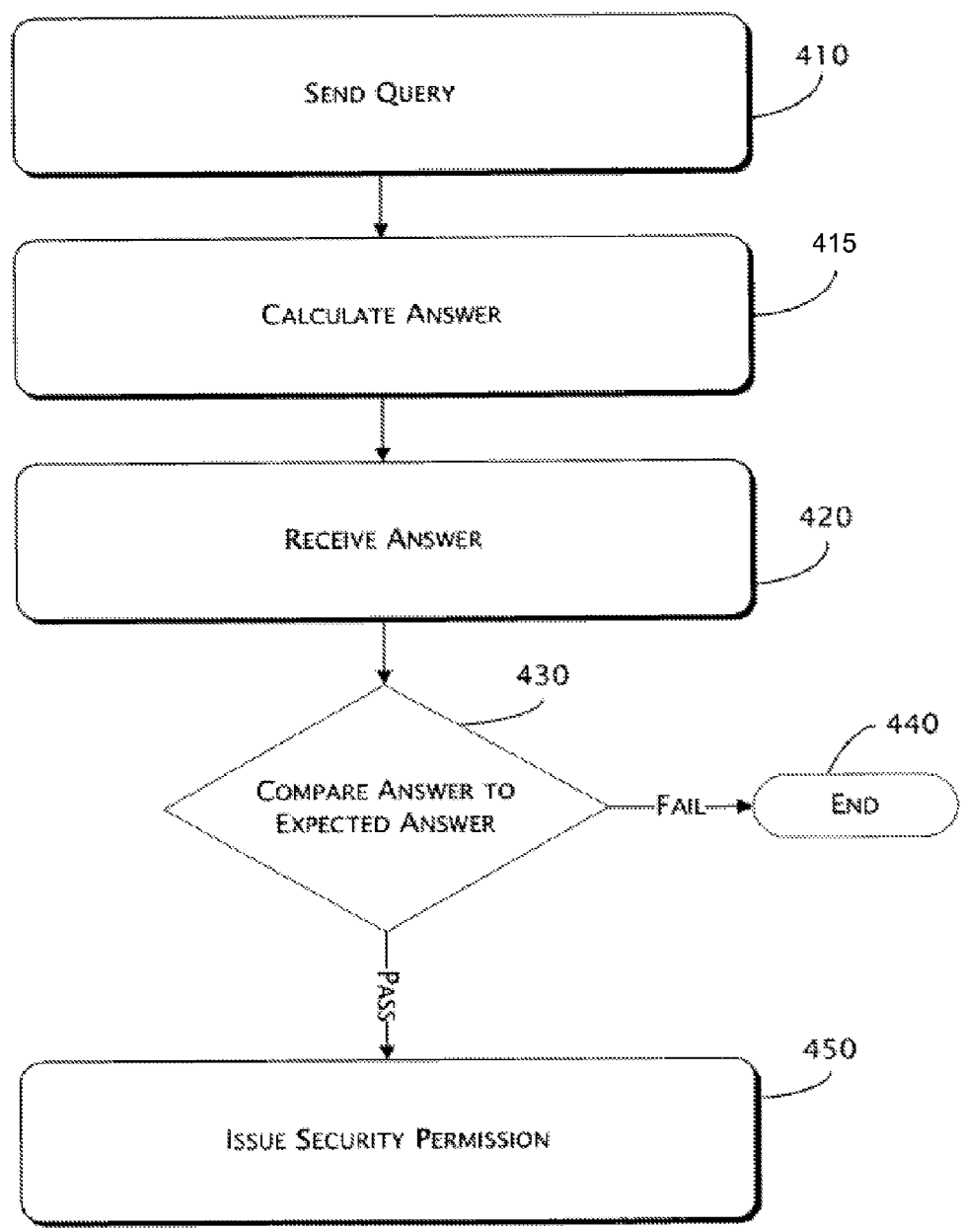
FIG. 4 is a flow diagram showing an exemplary process for performing a hardware functionality scan.

FIG. 4 is a flow diagram showing an exemplary process for performing a hardware functionality scan. The sequence 400 is typically executed on a CPU 320 (of FIG. 3), but may be executed on any processor.

At block 410 the CPU typically sends a query to the graphics device in order to verify the authenticity of the graphics device. As discussed earlier, the query may be constructed in such a way that agreed upon random values are used, and that only the real graphics device may be capable of providing an answer or response that verifies the graphics device.

Further, at block 415, the graphics device would then typically process the query to produce a result and send the result to the CPU for evaluation.

Next at block 420, the CPU typically receives the results of the query as from the graphics device. Note the CPU may not need to receive the results of the query to determine if the graphics device is real. A zero-knowledge-proof may be used with the graphics device for the graphics device to prove the graphics device has the correct answer without sending result of the query to the CPU. For example, the graphics device and the CPU may use the result of the query as a key to a follow-on message to the graphics device, and the graphics device may only continue to function if the graphics device had produced the correct response to the query as it may not have been able to receive the follow-on message which may have allowed it to continue functioning.

At block 430, the CPU would then typically compare the results of the query received from the graphics device to an expected result. The CPU may then analyze the results of the comparison and determine whether the comparison passed or failed. If the comparison failed the verification would typically end at block 440.

Terminating the process at block 440 may be the result of the CPU determining the result returned from the graphics device was different from the expected result which may indicate that either an unauthorized graphics device or a hacker is present. The flow of execution typically ends at this point because a security permission can not be issued to the graphics device because it was not validated.

Continuing the process at block 450 may be the result of the CPU determining the result returned from the graphics device was acceptable when compared to the expected result. The secure system may conclude that the graphics device has passed the hardware functionality scan and is an authentic graphics device and not a hacker with an emulation device. The CPU may then issue a security permission on behalf of the graphics device, the security permission indicating that the graphics device has been validated.

Figure 5:
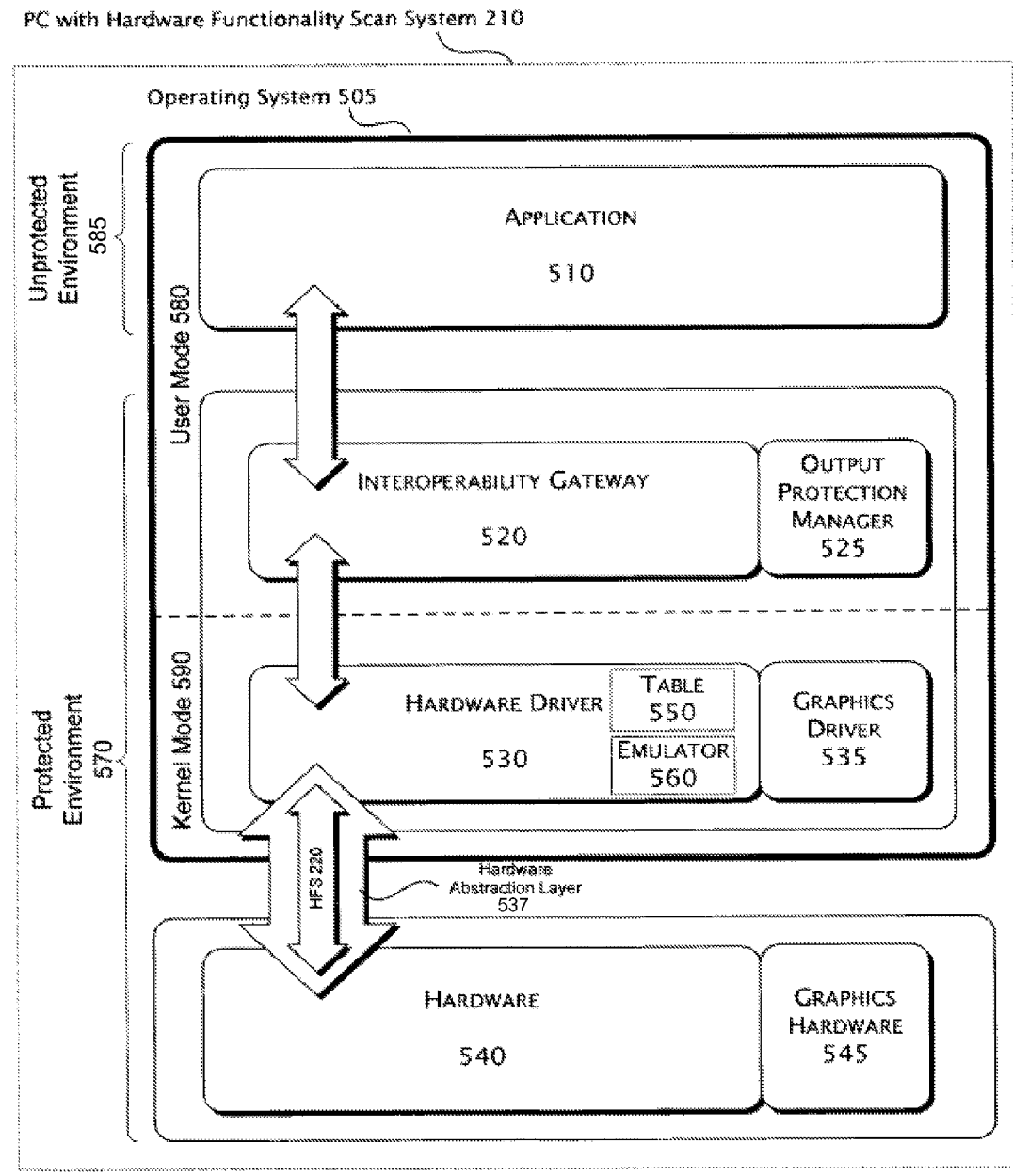
FIG. 5 is a block diagram showing an exemplary computing environment in which a hardware functionality scan system may be implemented.

FIG. 5 is a block diagram showing an exemplary computing environment in which a hardware functionality scan system may be implemented.

A PC with a hardware functionality scan system 210 (from FIG. 2) typically executes an operating system 505 to run an application 510. The application 510 is typically coupled to an interoperability gateway 520. The interoperability gateway 520 is typically coupled to a hardware driver 530, and in addition, the interoperability gateway 520 may have a secure coupling to hardware driver 530. The hardware driver 530 is typically coupled to a hardware abstraction layer 537, and the hardware abstraction layer 537 may be coupled to the hardware device 540.

The operating system 505 may implement a user mode 585 and a kernel mode 590. The application 510 is typically executed in user mode 585, and the interoperability gateway 520 is also typically executed in user mode 585. The hardware driver 530 is typically executed in kernel mode 590. The operating system 505 typically implements user mode 585 and kernel mode 590 for security reasons. The operating system 505 may provide user mode 585 with less security permissions than the operating system 505 may provide to kernel mode 590 because kernel mode 590 may have access to elements of the PC 210 which may be more vulnerable to access by hackers. The operating system 505 may not allow components which are not digitally signed and trust to be executed in kernel mode 590. The operating system 505 typically provides user mode 585 with less security permissions, and correspondingly less access to the elements of the PC 210 which may be more vulnerable to hackers. The operating system 505 may also typically execute user mode 585 and kernel mode 590 concurrently, and may further execute more than one instance of user mode 585 at once.

Further, the operating system 505 may typically implement an additional layer of security by including differing levels of security execution environments.

The operating system 505 may include an unprotected execution environment 580 and a protected execution environment 570, with the unprotected execution environment 580 including less security permissions than the protected execution environment 570. The operating system 505 may typically impose a set of security requirements before the operating system 505 may allow an interoperability gateway 520 or a hardware driver 530 to be either loaded or executed in the protected execution environment 570. For example, a security requirement may be some form of digital signing or other digital proof of trust. In this manner, the operating system 505 may trust the interoperability gateway 520 or the hardware driver 530 and grant the interoperability gateway 520 or the hardware driver 530 more access to the resources of the PC 210 which the operating system 505 controls. In addition, the operating system 505 may typically implement a smaller set of security requirements before it may allow the application 510 to be loaded or executed, but the operating system 505 may grant the application 510 less access to the resources of the PC 210 which the operating system 505 controls.

Since the hardware driver 530 may execute both in kernel mode 590 and in a protected execution environment 570, this level of security may be satisfactory to a content provider to authenticate the hardware device 540. Further, kernel mode 590 may require that the hardware driver 530 be digitally signed and trusted before it may be loaded and executed in kernel mode 590 to offer proof that the hardware driver 530 has been received from a legitimate source. Note that it is also important that only trusted drivers might be loaded. E.g., just because 530 is trusted doesn't solve the kernel mode problem unless all other drivers in kernel mode are also trusted. This concept needs captured somewhere in the document.

The operating system 505 may implement digital rights management ("DRM"). The content provider trusts DRM and the content provider in turn may require that DRM implements the policy given to DRM for the content. DRM may then verify the content is used with a digitally signed component (drivers, and user mode components), and if requested that the graphics driver has undergone a hardware functionality scan 220. The content provider may be satisfied that the hardware driver 530 has authenticated the hardware 540 on behalf of the content provider, and therefore the content provider may be satisfied a hacker has not replaced the real hardware device 540 with an emulation of the hardware device 540 typically to copy the content of the content provider at this vulnerable point.

While a real hardware device 540, for example graphics hardware 545, may offer protection from copying by implementing security elements which prevent unauthorized copying, a hacker or other unauthorized third party may create an emulation of the hardware device 540 and insert it in the PC 210. Such a counterfeit hardware device may appear to be the real hardware device 540, however, a hacker or other unauthorized third party may have constructed the emulated hardware device to report that security features are enabled when the security features are not enabled. In so doing, the device driver 530, for example a graphics driver 535, may provide a vulnerable version of the information from the content provider 110 to the counterfeit hardware device, and the counterfeit hardware device may freely copy the information.

Accordingly, the operating system 505 may verify that the hardware device 540 is real by using a signed and trusted driver 530, and requesting the hardware driver 530 perform a hardware functionality scan 220 using the hardware abstraction layer 537. The hardware functionality scan 220 may determine whether or not the hardware device 540 is a real hardware device and not an emulation put in place by a hacker. Furthermore, to ensure the integrity of Kernel Mode 590 the operating system 505 may verify that all components loaded into to kernel mode and signed and trusted.

The hardware functionality scan 220 is typically a query sent by the hardware driver 530 to the hardware 540. The query may be written to test the unique complex hardware structure of the hardware device 540. The hardware device 540 may be a complex device and it may be difficult for the emulation of the hardware device 540 to duplicate or produce the correct response. That is, the queries constructed by the hardware driver 530 when performing the hardware functionality scan 220 may be constructed in such a way that the answers to the queries typically uniquely identify the hardware device 540.

Further, the hardware driver 530 may store a table 550 of queries that it sends to the hardware device 540. These queries may accept random input data, and the hardware driver 530 may in turn select the input for the query at random. The hardware driver 530 may then compare the answer returned by the hardware 540 to an answer which it expects. Such a comparison may be done directly by requesting the answer from hardware 540 or alternatively may be done indirectly by using the answer in further operations which will only succeed if the hardware has generated the proper answer. If the hardware driver 530 determines the answers are equal, the hardware driver 530 may further determine the hardware device 540 is verified and authentic.

In another example, the hardware driver 530 may implement an emulator 560 of any portion of the hardware 540. The emulator 560 may be an emulation of the hardware 540 such that the hardware driver 530 may choose a value and perform an operation using the emulator 560, and then may pass the same value and request to the hardware 540 so the hardware 540 may perform the same operation with the same value. The hardware driver 530 may then verify the results of the operation as performed by the emulator 550 and the hardware 540 to determine the hardware 540 is verified and authentic.

Once the hardware driver 530 has performed the hardware functionality scan 220 and determined the real hardware device 540 is in place, the hardware driver 530 may have performed the function of authenticating and verifying the hardware device 540 and satisfied the trust agreed upon with the content provider as discussed earlier.

In another example, the PC 210 may use the interoperability gateway 520, for example an output protection manager 525, to manage a secure proof which may be provided by hardware driver 530 in response to verifying the hardware device 540 using a hardware functionality scan 220. In addition, the interoperability gateway 520 may offer a reduced subset of the functions offered by hardware driver 530, preventing a hacker from having any type of access to the functionality offered by hardware driver 530 that is not also offered by the interoperability gateway.

Figure 6:
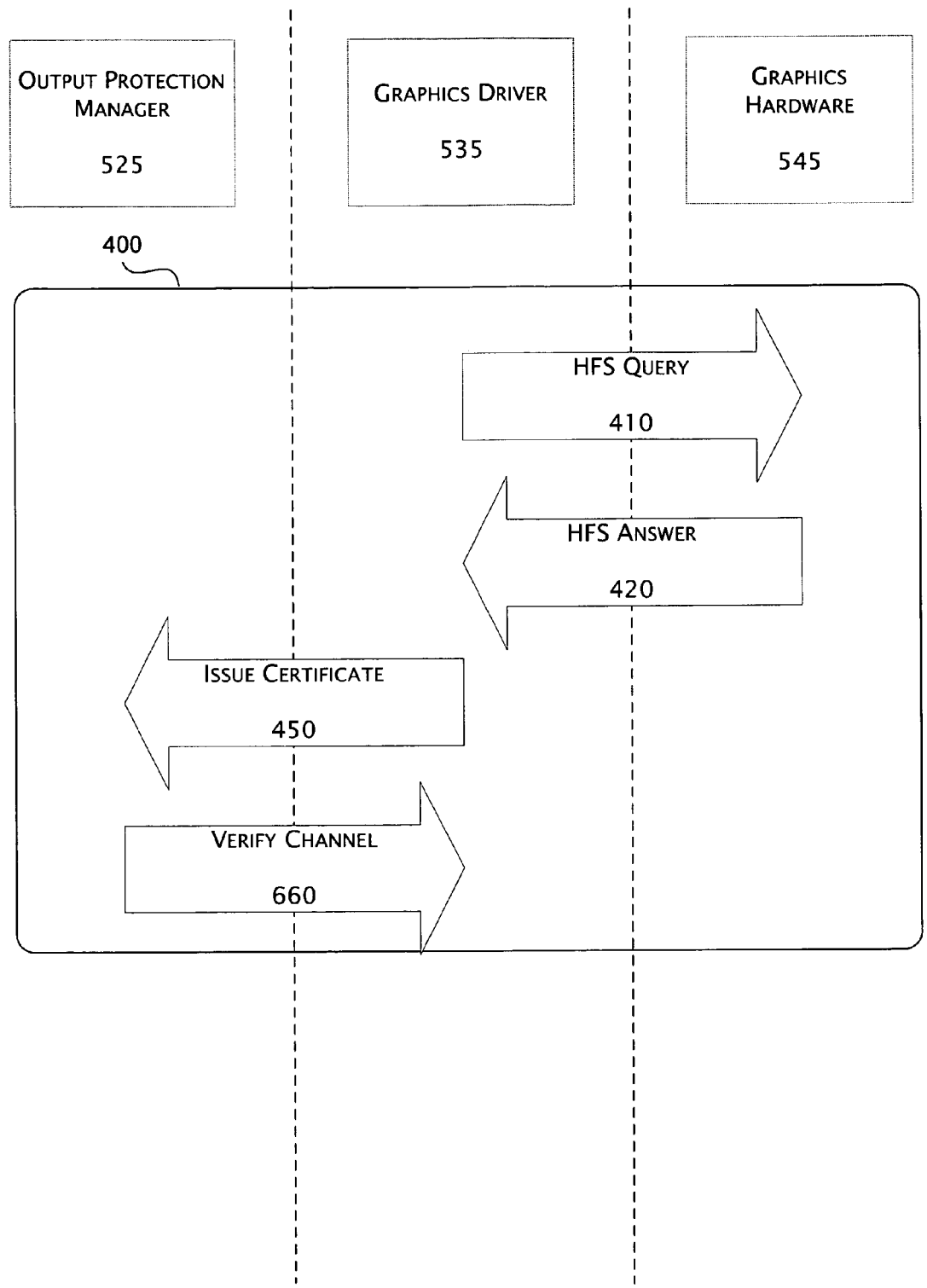
FIG. 6 is a block diagram showing an exemplary implementation of a hardware functionality scan system and the exchange of information between the elements of the exemplary implementation of a hardware functionality scan system.

FIG. 6 is a block diagram showing the hardware functionality scan process coupled to an output protection management software module that may communicate the results of the hardware functionality scan to the media pipeline 523.

A hardware functionality scan system may be configured to communicate the result of the hardware functionality scan to a system controlling content distribution such as the media pipeline. The system may include an output protection management module 525, a graphics driver 535, and graphics hardware 545.

The output protection management module 525 may be a module implemented in software which executes in a PC's protected environment and may also execute in the PC's user mode. The output protection management module 525 may act as a security authority which receives a security certificate or other secure form of proof indicating the graphics driver 545 is trusted, has performed a hardware functionality scan 220, which may include a hardware functionality scan query 410 and a hardware functionality scan response 420. Furthermore, the output protection management module 525 may receive a security certificate or other secure form of proof indication that kernel mode 590 is trusted. The output protection management module 525 may communicate the existence of the security certificates or other secure form of proof to a content provider.

The graphics driver 535 is typically implemented in a conventional PC to provide a consistent and single point of access to the graphics hardware 545 as discussed earlier. The graphics hardware 545 may be any hardware device which is used to render shapes or other graphical information as instructed by the PC. The graphics hardware 545 may include a single integrated circuit chip or may be made up of any combination of integrated circuit chips.

A content provider may request proof that the graphics hardware 545 is authentic and verified before the content provider may trust the graphics driver 545 to play premium or high value content on the PC. The content provider may not be able to communicate directly with the graphics driver 535, and may not be able to determine if the graphics driver 535 performed a hardware functionality scan query 410 and has received a hardware functionality scan response 420 which has verified the graphics hardware 545.

However, because the operating system 505 is trusted, which may verify that the protected environment 570 is trusted by verifying the interoperability gateway 520, the output protection manager 525, and hardware driver 530, the graphics driver 535 are trusted, the content provider may trust the operating system 505 to enforce the hardware driver 530 utilizes a hardware functionality scan 220 to verify hardware 540 is trusted before content which may require such trust is given to the hardware driver 530 from the interoperability gateway 520.

For example, the graphics driver 535 may create a hardware functionality scan query 410 and send the hardware functionality scan query 410 to the graphics hardware 545. The hardware functionality scan query 410 is typically constructed in such a way that the hardware functionality scan answer 420 confirms that graphics hardware 545 is legitimate and not a counterfeit or other device put in place by a hacker for the purpose of copying content. Also, the hardware functionality scan query 410 may take any form, but typically is in the form of a function which will be performed in areas of the graphics hardware 545 that are difficult for a hacker to emulate. Also, the hardware functionality scan answer 420 may take any form to determine the graphics hardware 545 has independently produced the proper answer, but typically is in the form of data which can be compared to the expected answer.

Next, the graphics driver 535 determines the hardware functionality scan answer. For example, the graphics driver 535 may have drawn the answer from a lookup table stored within the graphics driver 535, or the graphics driver 535 may have picked a value, either at random or from a set schedule of values, and passed the value to an internal emulation of the graphics hardware 545, or may have used some combination thereof. Further, in an alternative example, the graphics hardware 545 and the graphics driver 535 may have agreed on a random value which both the graphics hardware 545 and the graphics driver 535 will use as an input to the query 410. The internal emulation of the graphics hardware 545 stored within the graphics driver 535 may then calculate the answer using the selected value as an input to the internal emulation.

Next, the graphics hardware 545 calculates the hardware functionality scan answer 420 and typically returns it to the graphics driver 535.

Then the graphics driver 535 determines the hardware functionality scan answer 420 the graphics hardware 545 produced matches the answer the graphics driver 535 calculated. If the graphics driver 535 determines the answer is equal to the expected answer, the graphics driver 535 may confirm the authenticity of the graphics hardware 545. For example, the graphics driver 535 may then send a secure notification to the output protection management module 525.

Next, the output protection management module 525 or the graphics driver 535 may store the security status for as long as is necessary. The output protection management module may also issue a request to the graphics driver 535 such that the graphics driver 535 sends a new hardware functionality scan query 410 to re-verify the authenticity of the graphics hardware 545.

Finally, once the output protection management module 525 has received the security status, the output protection management module 525 may request the graphics driver 535 verify the channel 660 between the graphics driver 535 and the graphics hardware 545. Once the graphics driver 535 has verified the channel 660 between the graphics driver 535 and the graphics hardware 545, the output protection management module 525 may then communicate with the content provider and indicate the coupling between the graphics driver 535 and the graphics hardware 545 is secure and may play the premium or protected content.

Figure 7:
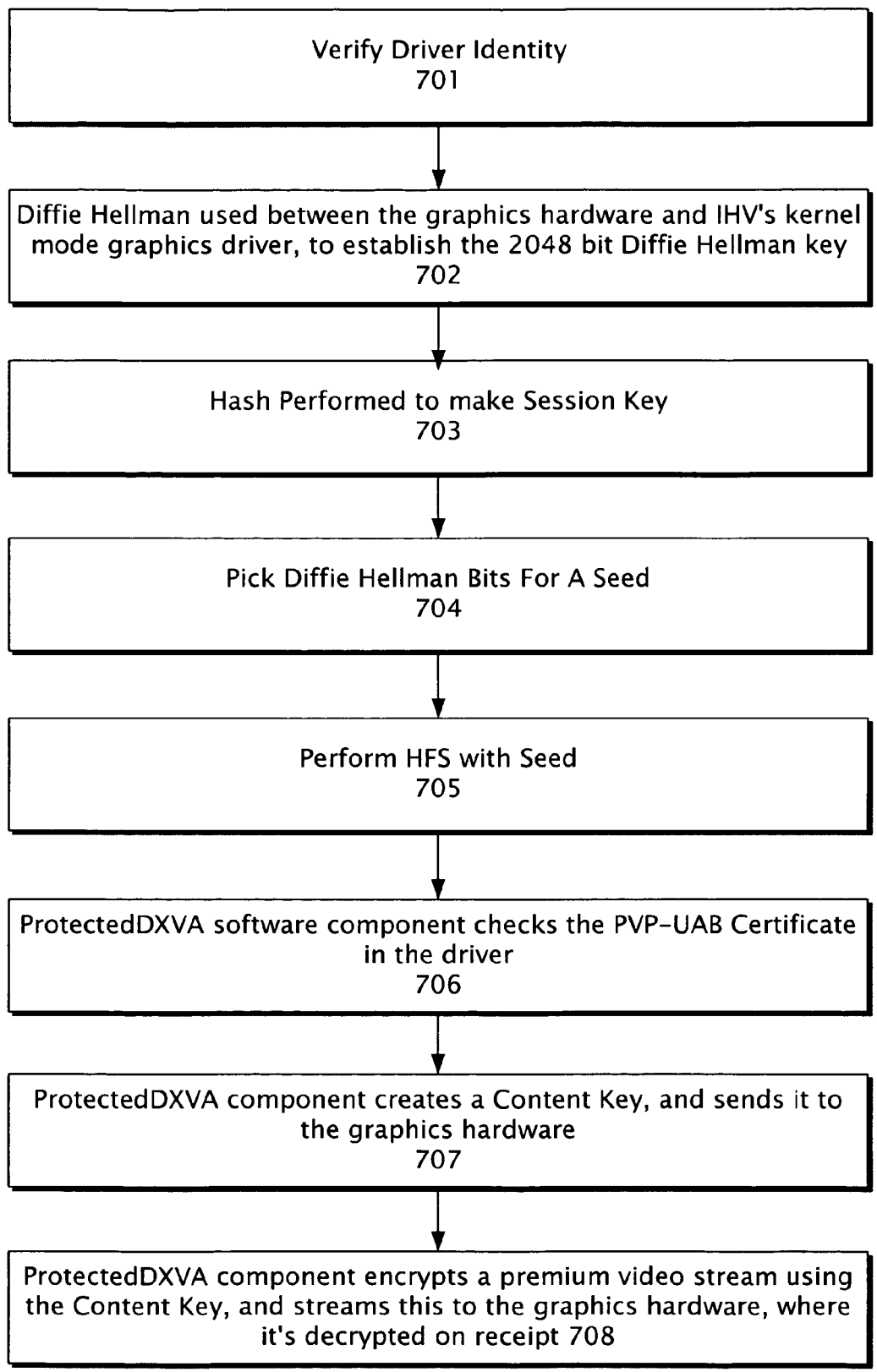
FIG. 7 is a flow diagram showing the sequence of events used to establish a secure transfer across the bus to a properly authenticated graphics chip.

FIG. 7 is a flow diagram showing the sequence of events used to establish a secure transfer across the bus to a properly authenticated graphics chip. First the driver is identity verified 701. The protected environment software will not halt processing with the driver on the system.

Diffie Hellman is then used between the graphics hardware and the Independent Hardware Vendor's ("IHV") kernel mode graphics driver, to establish the 2048 bit Diffie Hellman key 702. At this point in the process a key has been established that's known only to the graphics hardware and the IHV's driver.

A hash is performed to produce a Session Key 703. The IHV kernel mode driver passes the 2048 bit Diffie Hellman number to the service provider's Device Driver Model ("DDM") kernel mode component. The DDM component then performs an AES Davies Meyer hash to produce the 128 bit Session Key. The graphics hardware also does an AES Davies Meyer hash to also obtain the Session Key. Neither the IHV KMD nor the graphics hardware may store the Diffie Hellman key. In an alternative example the Diffie Hellman key is discarded. At this point a Session Key may be established that's known only to the graphics hardware and the service provider DDM kernel mode component.

Next Diffie Hellman bits are picked for a seed 704. The graphics driver does a hardware functionality scan as previously described to authenticate the graphics hardware 705. It may use 6 or more bits from the Diffie Hellman number as a seed value to tie together the authentication with the Diffie Hellman process which may mitigate man in the middle attacks. Any number of bits determined to provide sufficient security in a given application may be used. The graphics driver may now trust that the graphics hardware is genuine and that the Diffie Hellman process was not subject to a Man In The Middle attack.

Next, the ProtectedDXVA software component, for example the operating system software component which may perform encryption of the data that may pass over the bus to the graphics card, may check the protected video path-user accessible bus ("PVP-UAB") Certificate in the driver 706. This may establish trust that the driver is genuine, and conforms to all the PVP-UAB requirements, for example, hardware decryption and proper establishing of keys. The media interoperable gateway ("MIG") software may now trust the graphics hardware and may allow premium content to flow.

Next, the ProtectedDXVA component creates a Content Key, and sends the Content Key to the graphics hardware 707. Whenever a new Content Key may be needed for a new premium video stream, the ProtectedDXVA component sends the Content Key by requesting the service provider DDM kernel component encrypt the Content Key with the Session Key. Now the Content Key is known to the ProtectedDXVA software component and the graphics hardware.

Finally, the ProtectedDXVA component encrypts a premium video stream using the Content Key and streams the encrypted video stream to the graphics hardware where the encrypted video stream is decrypted on receipt 708. The premium content has now been safely delivered from the MIG software Protected Environment to the graphics hardware.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of chip authentication comprising:
    verifying a driver identity by a computer system;
    establishing a Diffie Hellman key based at least partly upon an interaction with a graphics hardware device, security of the graphics hardware device being unknown to the computer system;
    hashing the Diffie Hellman key;
    picking a seed, the seed being based at least partly upon the Diffie Hellman key; and
    performing a hardware functionality scan of the graphics hardware device with the seed by;
        sending one or more queries associated with the seed to the graphics hardware device, the one or more queries being configured to test one or more identifying hardware structure characteristics of the graphics hardware device;
        receiving one or more responses to the one or more queries; and
        comparing the one or more responses to one or more expected responses for the graphics hardware device.

2. The method of chip authentication of claim 1, further comprising:
    checking a driver certificate;
    creating a content key;
    sending the content key to the graphics hardware device;
    streaming a video signal to the graphics hardware device.

3. The method of chip authentication of claim 1, in which the graphics hardware device is a graphics chip.

4. The method of chip authentication of claim 1, in which the hashing is performed using an AES Davies Meyer Hash.

5. The method of chip authentication of claim 1, in which the seed is taken from the Diffie Hellman key.

6. The method of chip authentication of claim 1, in which the seed includes any number of bits taken from the Diffie Hellman key.

7. The method of chip authentication of claim 1, wherein the graphics hardware device is a graphics chip and wherein a first query of the one or more queries includes a request for a graphics calculation.

8. The method of chip authentication of claim 1, wherein performing the hardware functionality scan includes:
    sending a follow-on message to the graphics hardware device, wherein one or more responses to the one or more queries are used to generate a key for the follow-on message.

9. The method of chip authentication of claim 1, wherein the graphics hardware device is not allowed to store the Diffie Hellman key.

10. A computer storage media having instructions stored thereon that when executed by a computing device perform a method, comprising:
    establishing a Diffie Hellman key based at least partly upon an interaction with a graphics hardware device;
    hashing the Diffie Hellman key;
    picking a seed, the seed being based at least partly upon the Diffie Hellman key;
    performing a hardware functionality scan of the graphics hardware device with the seed by;
        sending one or more queries associated with the seed to the graphics hardware device;
        receiving one or more responses to the one or more queries; and
        validating the graphics hardware device by comparing the one or more responses to one or more expected responses for the graphics hardware device.

* * * * *

UNITED STATES PATENT AND TRADEMARK OFFICE
CERTIFICATE OF CORRECTION

| | | |
|---|---|---|
| PATENT NO. | : 7,739,505 B2 | |
| APPLICATION NO. | : 11/202838 | |
| DATED | : June 15, 2010 | |
| INVENTOR(S) | : Kenneth Reneris et al. | |

It is certified that error appears in the above-identified patent and that said Letters Patent is hereby corrected as shown below:

In column 8, line 62, after "535" insert -- has --.

Signed and Sealed this
Eighth Day of February, 2011

David J. Kappos
*Director of the United States Patent and Trademark Office*